Feb. 28, 1967 D. J. KLEIN 3,306,986

STATION-TO-STATION TELEPHONE SET FOR EXTREME SHOCK CONDITIONS UTILIZING AN AUTOMATIC STATION SELECTOR SWITCH RETURN MECHANISM

Filed Oct. 1, 1963 5 Sheets-Sheet 1

INVENTOR
DIETRICH J. KLEIN

BY Watson, Cole, Grindle & Watson
ATTORNEYS

INVENTOR
DIETRICH J. KLEIN

BY Watson, Cole, Grindle & Watson
ATTORNEYS

Feb. 28, 1967 D. J. KLEIN 3,306,986

STATION-TO-STATION TELEPHONE SET FOR EXTREME SHOCK CONDITIONS UTILIZING AN AUTOMATIC STATION SELECTOR SWITCH RETURN MECHANISM

Filed Oct. 1, 1963 5 Sheets-Sheet 3

INVENTOR

DIETRICH J. KLEIN

BY Watson, Cole, Grindle & Watson

ATTORNEYS

Feb. 28, 1967 D. J. KLEIN 3,306,986

STATION-TO-STATION TELEPHONE SET FOR EXTREME SHOCK CONDITIONS UTILIZING AN AUTOMATIC STATION SELECTOR SWITCH RETURN MECHANISM

Filed Oct. 1, 1963 5 Sheets-Sheet 4

INVENTOR

DIETRICH J. KLEIN

BY Watson, Cole, Grindle & Watson

ATTORNEYS

Feb. 28, 1967    D. J. KLEIN    3,306,986

STATION-TO-STATION TELEPHONE SET FOR EXTREME SHOCK CONDITIONS UTILIZING AN AUTOMATIC STATION SELECTOR SWITCH RETURN MECHANISM

Filed Oct. 1, 1963    5 Sheets-Sheet 5

INVENTOR
DIETRICH J. KLEIN

BY Watson, Cole, Grindle & Watson
ATTORNEYS

United States Patent Office 3,306,986
Patented Feb. 28, 1967

3,306,986

STATION-TO-STATION TELEPHONE SET FOR EXTREME SHOCK CONDITIONS UTILIZING AN AUTOMATIC STATION SELECTOR SWITCH RETURN MECHANISM

Dietrich J. Klein, Charlottesville, Va., assignor to Stromberg-Carlson Corporation, a corporation of Delaware Filed Oct. 1, 1963, Ser. No. 312,965
3 Claims. (Cl. 179—100)

This invention relates generally to telephone sets and more specifically it relates to automatic station-to-station sets such as used on ships where extreme shock conditions and foul weather are frequently encountered, and wherein station selection switching is manually performed.

In the stress of weather or battle conditions aboard ship, a manually switched telephone station is subject to human error limitations. For example, it is possible that the handset may not be returned properly when haste is required, and complex locking mechanisms need be provided for holding the handset in place against shock. This could result in improper operation of the hookswitch and probable dislodging of the handset under subsequent shock.

Furthermore, in many such station-to-station installations, manual station selection is required. Thus, to call the bridge or engine room, the operator must select a proper switch position. Also he must return the switch to a home position after the call to set the line up for an incoming call. The operator may neglect to do this at times, or may carelessly return the switch to an erroneous setting.

Accordingly, an object of the present invention is to provide improved station-to-station telephone apparatus with semi-automatic features.

A further object of the invention is to provide telephone equipment which has improved features precluding erroneous human operation of the type set forth above.

A further object of the invention is to provide semi-automatic switching equipment for returning a telephone station set into a call receiving condition after use.

Another object of the invention is to provide ruggedized and simply operated means for holding telephone handsets securely in the presence of shock.

Accordingly, the present invention provides for an improved telephone station set suitable for shipboard installations, where selective communication between a plurality of stations is afforded responsive to manual positioning of a station selector switch. The improvements provide a mechanical handset holder-lock assembly coupled with an automatic station selector switch return mechanism. This automatically sets the communication station in a homing or call receiving position at the end of a call, and thus eliminates the human factors of either remembering to actuate the switch or erroneous operation by return to a wrong setting.

The locking mechanism is fashioned for automatic action during replacement and removal of the handset responsive to normal repositioning action of the operator's hand and requires no special precaution or thought to secure the handset into position.

An automatic homing switch is provided for operation by the handset to return the switch to home position as the handset is repositioned. This switching arrangement is described and claimed in a co-pending applicaton of this inventor, Serial No. 300,315, filed August 6, 1963, now Patent No. 3,210,481.

Other features and advantages of the invention are described with reference to the accompanying drawings, wherein.

Figure 1:
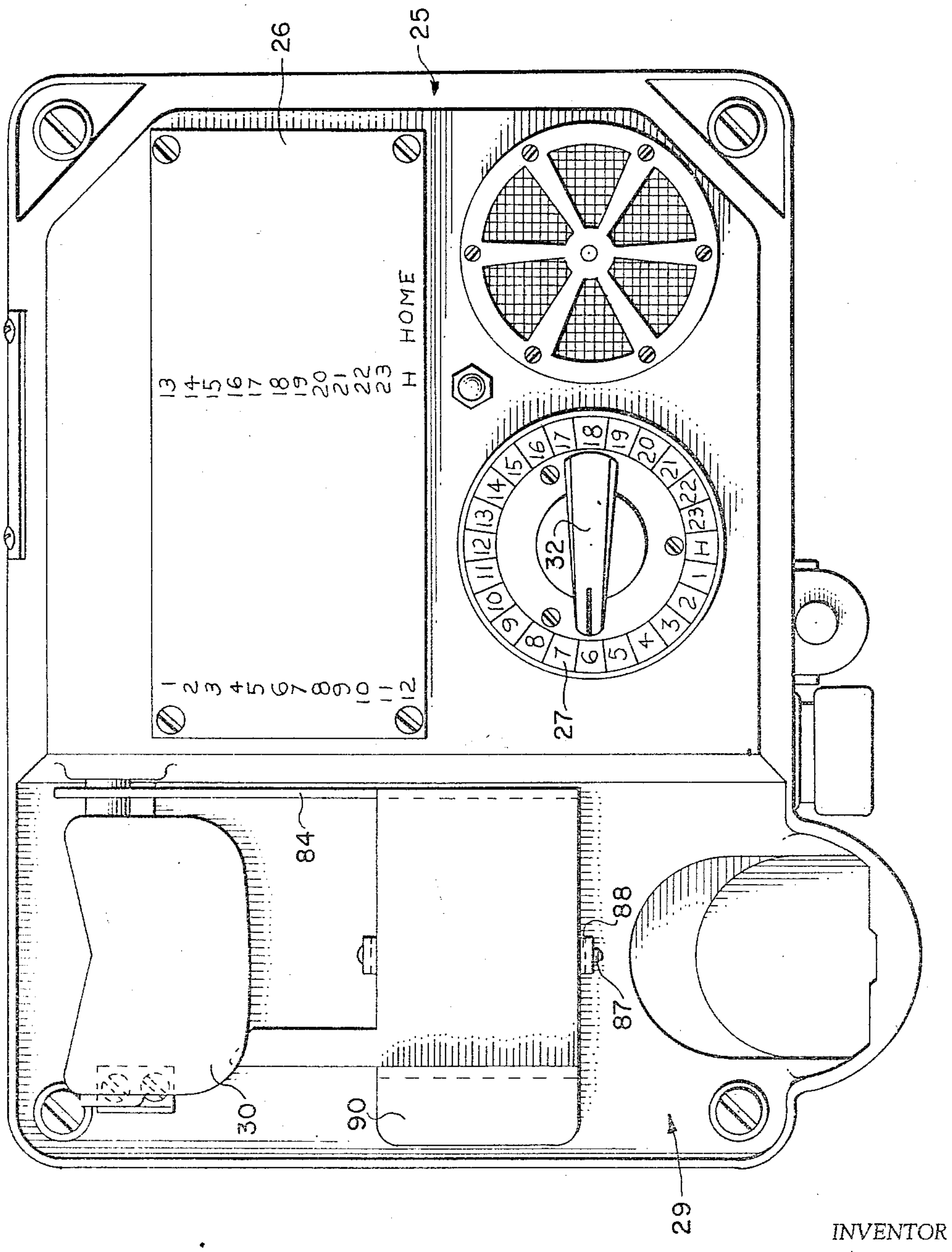
FIGURE 1 is a front panel view of a telephone station set constructed in accordance with an embodiment of the invention.

The telephone station set 25 is constructed for shipboard communication purposes, and may be connected to not more than twenty-two other similar stations to that shown, as identified on panel 26 by the twenty-three switching positions plus home position H. When a call is made, for example to station 6, as shown by the indexed position of selector dial 27 of wafer switch 28, the operator removes the handset (not shown) from the receptacle 29 by pushing up the pivoted cup 30. Then, the operator selects station 6 by rotating the selector knob 32 affixed to the shaft 31 of switch 28 from the home position H to station 6. This conditions the telephone set to place a call to the selected station in accordance with telephone switching circuitry, not shown, in order to better illustrate the nature of the present invention and because the switching circuitry of the telephone system may be entirely conventional. There is a provision in such conventional switching circuits that after each use, the switch 28 must be returned to the home position H to condition the station to receive incoming calls. Thus, in conventional sets the operator must remember to return the switch to H in a final manual operation upon completion of the call, and must pay close attention that the switch is detented properly and is not in an adjacent switching position.

Figure 2:
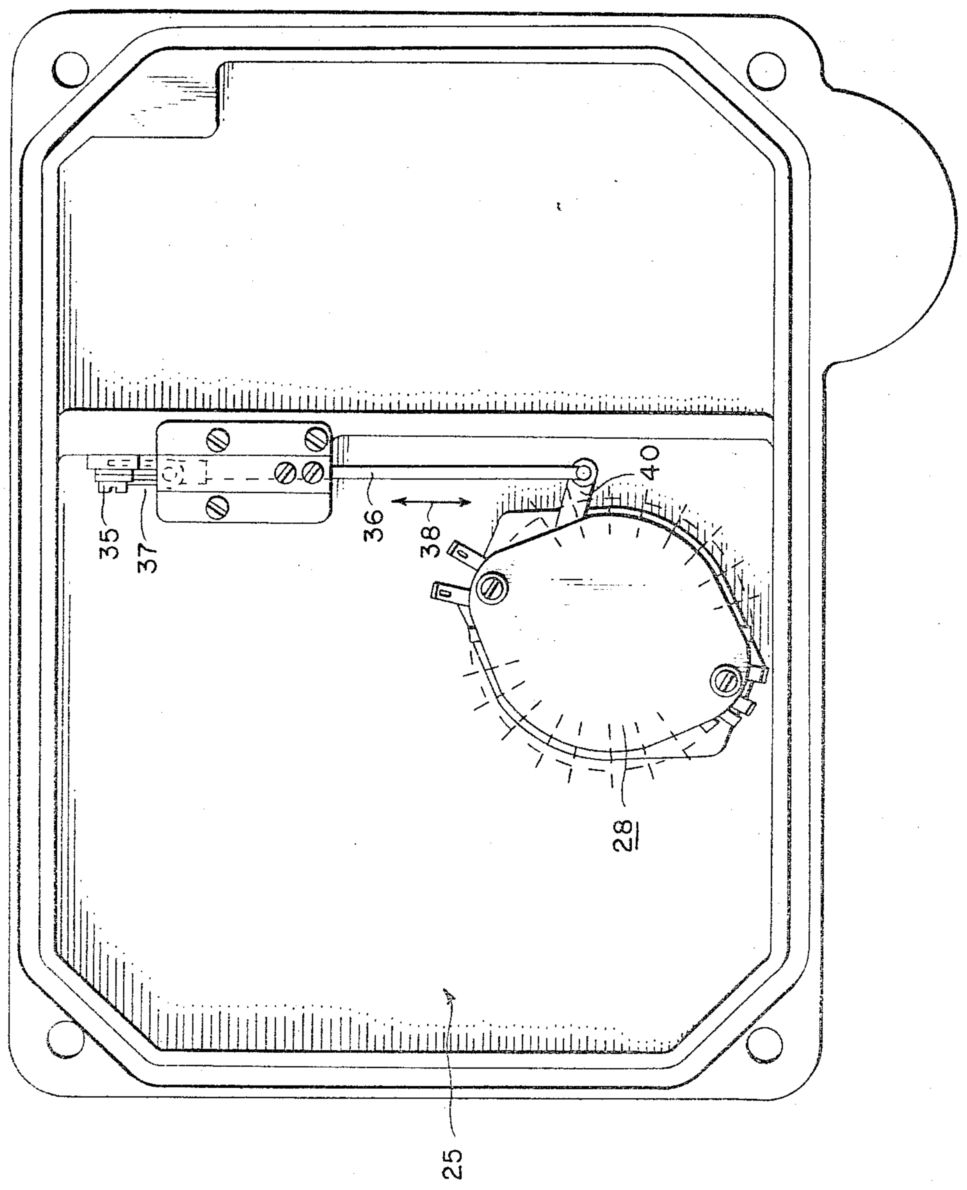
FIGURE 2 is a back panel view of the telephone set showing the switching selector arrangement afforded by the invention.

However, in accordance with this invention, switch 28 is a special switch which provides automatic return to the home position H when the handset is returned to receptacle 29 and the pivoted cup 30 is moved out of its downward position. As shown in FIGURE 2, the pivot shaft 35 of cup 30 is coupled to an actuating rod 36 by an intermediate linkage 37 so that the rod moves vertically as shown by arrow 38 in response to the motion of the pivoted cup 30 as the handset is returned to the receptacle 29. Normally, the cup 30 is in its downward position, as shown, when the handset is removed from the receptacle and the switch homing mechanism is triggered only upon the return of the handset into position, when the cup 30 moves rod 36 to actuate cam 40. Thus, motion of rod 36 pivots the cam 40 (shown in FIG. 7) about the shaft 31 of the switch 28 to disengage the detent mechanism shown in FIGURE 6, thereby sending the switch to home position.

The cup 30 assumes three functional positions, namely: (1) the downward position, in which it is shown, as assumed when the handset is removed, where the switch detents 45, 46 are engaged so that the switch may be set and held in any selected position; (2) the horizontal position when the handset is in the receptacle, where the detents are disengaged and the switch is in home position and cannot be set to any other position; and (3) the momentary position to the uppermost extremity reached when replacing the handset in the receptacle, where the detents 45, 46 are released and the switch is homed as the cup 30 is removed from its downward position.

Figure 5:
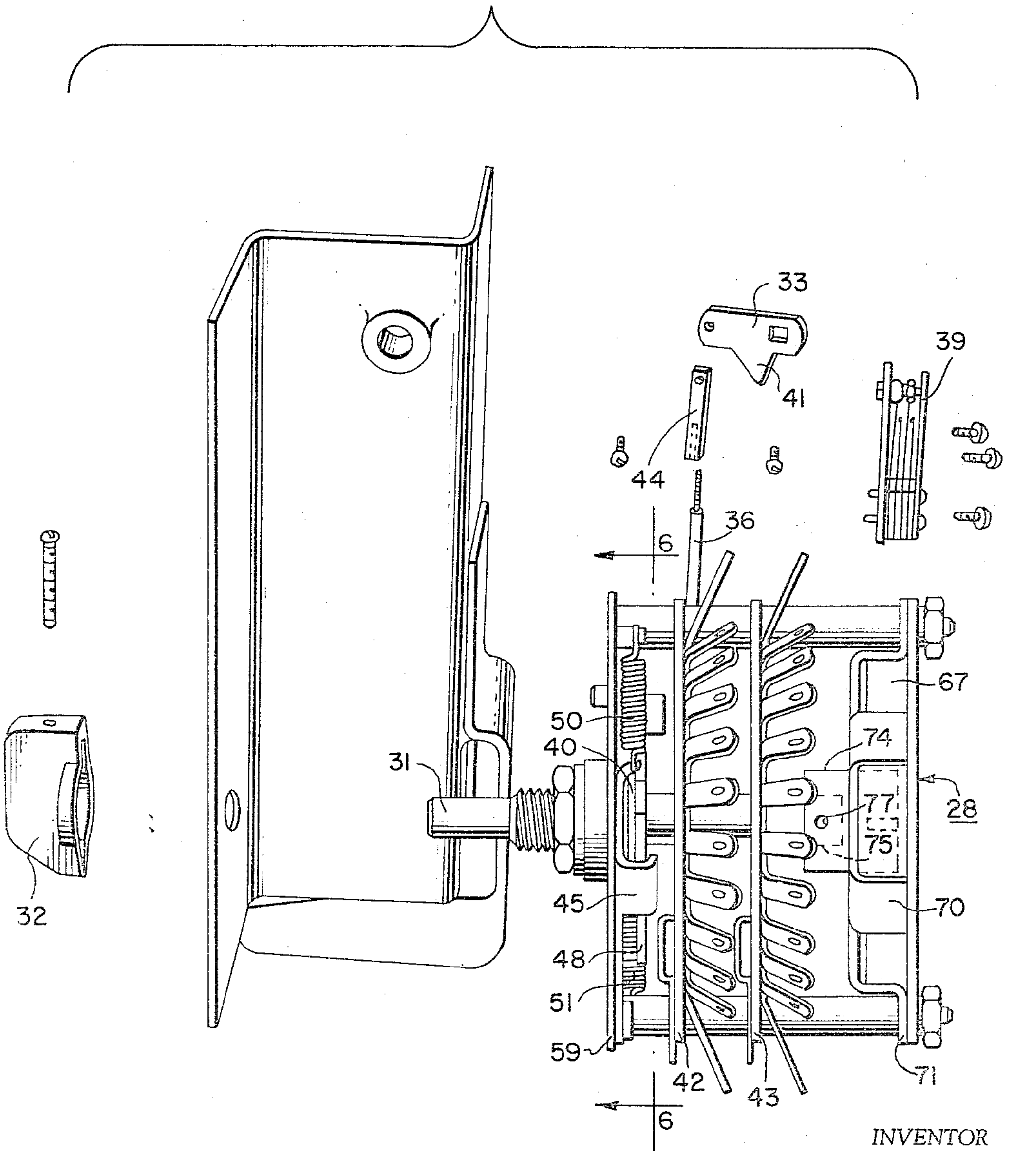
FIGURE 5 is an exploded back perspective view of the handset sub-assembly of FIGURE 4, showing on an enlarged scale the station selector switch assembly afforded by the invention.

The switch assembly shown in FIGURE 5 has appropriate fixed switching wafers 42, 43 which cooperate with rotary mounted mating switch contact structure positioned by the indexing shaft 31. As the shaft 31 is rotated, the pivoted detent assemblies 45, 46 engage a detent plate 48 rotatable with shaft 31 to thereby define a plurality of switching positions. Manual force on selector knob 32 serves to pivot these detent assemblies 45, 46 against pressure of springs 50, 51 about pivot axes 52, 63 to engage rollers 53, 54 in selected scallops 55 on the detent plate 48.

In accordance with this invention, the homing trigger cam plate 40 rotates about the switch shaft 31 by means of aperture 58, as it is located between the detent plate 48 and switch face plate 59. As the cam plate 40 is pivoted, the opposite cam surfaces 60, 61 pivot back the detent assemblies 45 and 46 to disengage detent rollers 53 and 54 from the scallops 55 on detent plate 48. Thus, the switch shaft 31 is no longer detained in position and is free to rotate to its home position H.

Figures 6, 7:
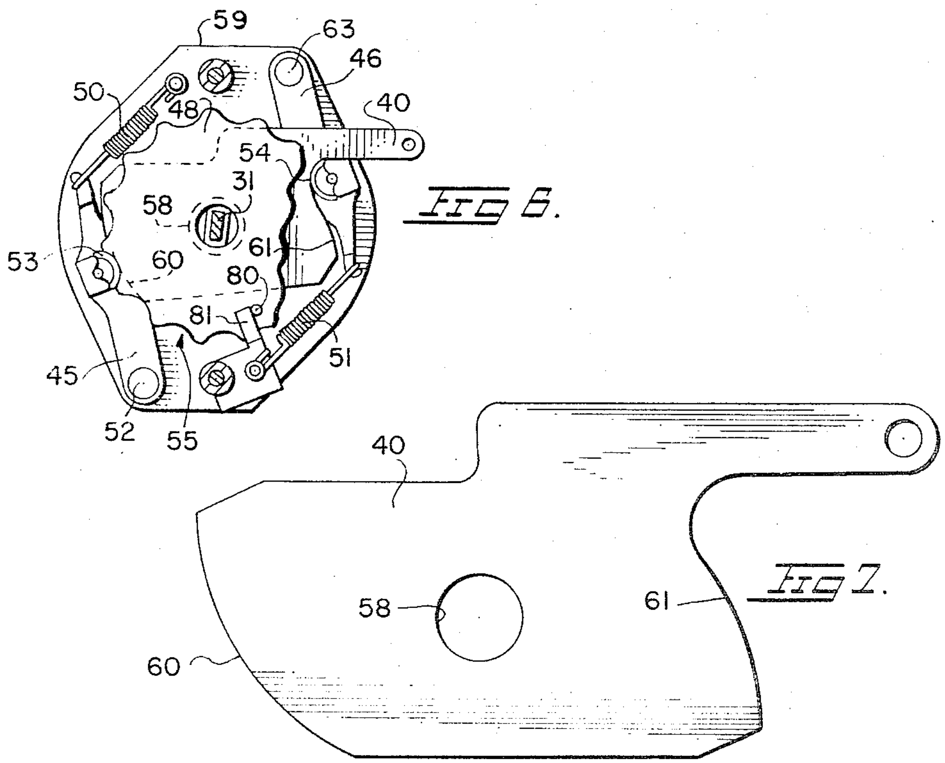
FIGURE 6 is a section view of the switch of FIGURE 5 taken along lines 6—6, as partly broken away.
FIGURES 7 to 9 are detailed views, on an enlarged scale, of parts of the selector switch afforded in accordance with the teachings of this invention.
Figure 8:
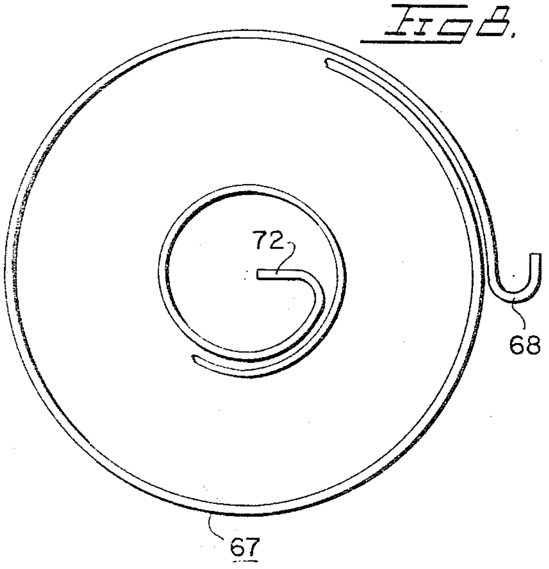
Figure 9:
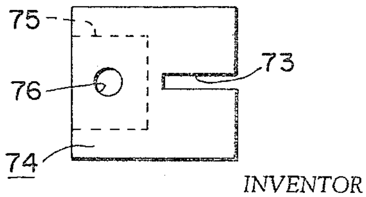

To send the switch to the home position, a torsion spring 67 (FIGURE 8) is provided with an outer hook 68 which may be anchored to the frame of the switch, such as to a leg 70 of the spring enclosure spider 71. The inner hook 72 engages a slot 73 of a coupling member 74 (FIGURE 9) which engages the rectangular wafer end of switch shaft 31 by means of the mating internal channel 75. A set screw 77 may hold the coupling member 74 on the shaft 31 through hole 76. The shaft is urged by spring 67 towards home position H at which it is stopped by pin 80 engaging stop 81 (FIGURE 6). The force of the spring is chosen such that it is readily overcome by manual positioning of selector knob 32, and such that it does not overcome the force of the detent mechanism until released by cam 40.

Figures 3, 4:
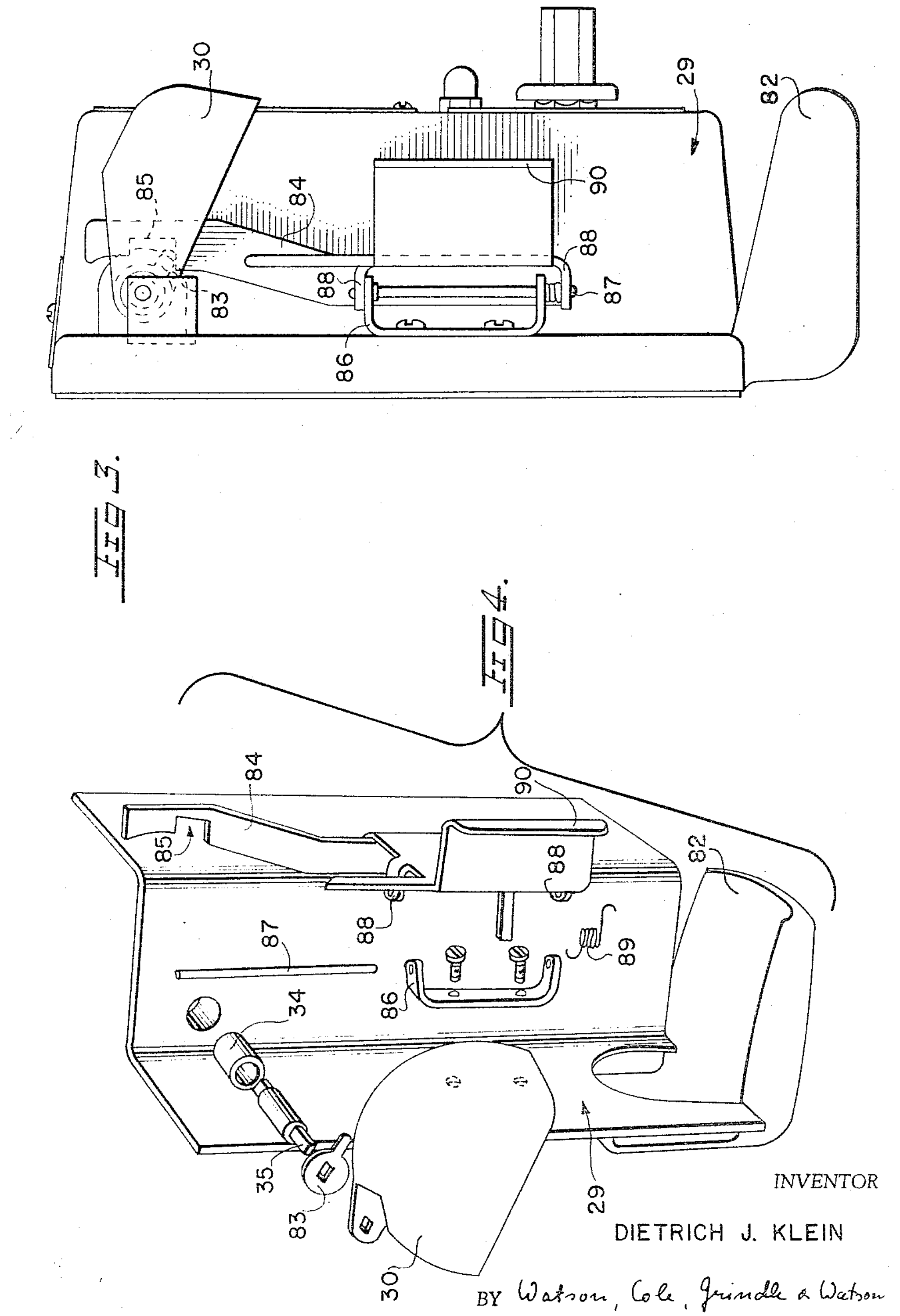
FIGURE 3 is a side view of the telephone set showing the handset locking arrangement provided in accordance with the invention.
FIGURE 4 is an exploded front perspective view of a handset receptacle and hookswitch sub-assembly afforded by the invention as shown in the view of FIGURE 3.

Thus, it may be seen that rotation of trigger cam 40, as actuated by motion of the hookswitch assembly operable through the motion of pivoted cup 30, serves to release the detent mechanism, thereby permitting the contact structure to return to the home position H under influence of the torsion spring 67. As seen in FIGURES 4 and 5, the pivot shaft 35 as coupled to the cup 30, extends through bushing 34 to rotate actuator 33 for operation of the hookswitch 39 by extension cam 41. Also coupled to actuator 33 is connector yoke 44 which couples the actuating rod 36 to operate the homing cam 40 of switch 28.

Similarly, locking mechanism is provided responsive to motion of the pivoted cup 30 to hold the handset (not shown) firmly in position. The receptacle 29 includes a lower holder 82 and the upper cup 30 which rests down snugly upon the handset when in position in receptacle 29. Each of these holder parts may be shaped metal holders covered by rubber compound to provide both corrosion resistance and an elastic friction mounting for the handset.

However, since shock of storm or gunfire aboard ship may displace the handset solely with gravity and hookswitch spring return action on cup 30, a locking mechanism is provided in the form of detent plate 83 and latch member 84, which has a mating catch 85 for receiving the detent extension of plate 83.

The latch member 84 is a pivoted lever assembly mounted on a bracket 86 by pin 87 through mounting tabs 88. By means of spring 89, the latch is held in counterclockwise pivoted position to retain the detent extension of plate 83 against movement within the limits of the mating catch 85. Thus, the cup 30 is held by the normal downward pressure of springs 50 and 51 in its downward position as restricted by plate 83 engaging catch 85 when the handset is removed from receptacle 29.

When the handset is to be removed or replaced the cup 30 must be pivoted upwardly. Thus, latch member 84 must be released. This is done simply by means of extension lever 90 which is placed to cause latch 84 to rotate clockwise against spring 89 under force of an operator's hand when he normally reaches to grasp the handset for removal. Thus, no special thinking or extraneous motion is necessary to release the handset, which then forces the pivoted cup upward to release the hookswitch 39. Similarly on return of the handset after a call is completed lever 90 is moved by the operator's hand and cup 30 may be pushed up by the handset as it is pushed into receptacle 29. During this motion it is assured that the switch 28 is returned to home position H automatically so that the set is conditioned to receive incoming calls.

Accordingly, an automated and fool proof handset locking and switching operation is provided in accordance with the invention, the features of novelty being defined in the appended claims.

What is claimed is:

1. A station-to-station telephone set comprising in combination, a handset, a receptacle for retaining the handset when not in use, a pivotable hookswitch operating assembly for establishing appropriate connections responsive to the position of the handset both when in use and when returned to the receptacle, a station selector switch having a plurality of manually selectable connection positions and a home position for conditioning the station to receive calls from other stations, means coupled to the station selector switch to return it to the home position upon actuation of a lever, a coupling between the hookswitch operating assembly and the lever to cause the switch to return to the home position when the handset is returned to the receptacle after use, locking means comprising a further lever engaging mating structure on the hookswitch operating assembly to lock the handset in position in said receptacle only in the pivoted position of the hookswitch when the handset is returned to the receptacle after use, and a manually operable release lever positioned to unlock the handset responsive to pressure from an operator's hand when the handset is grasped for removal from the receptacle.

2. In a telephone station having a handset, handset locking apparatus comprising in combination, a receptacle for holding the handset after use, a pivoted hook switch lever assembly with a cup enveloping one end of the hand set to clamp it in said receptacle, which cup is pivotably displaced as the handset is removed from and returned to its position in said receptable, automatic locking means comprising a lever pivoted in one position to engage mating structure in the hook switch assembly only when pivoted in the position assumed upon the return of the handset to its position in the receptacle to lock said cup firmly in place over the end of the handset, and release means mounted on said locking means lever adjacent the handset position to intercept an operator's hand when grasping the handset to remove it thereby to disengage the locking means and permit the handset to be removed for use.

3. In a station-to-station telephone having a handset, a receptacle for holding the handset, a manually operated station selector switch, and a hookswitch assembly movable by the handset into different positions when in said receptacle and removed therefrom for use, the combination of a hookswitch operated holding means for holding the handset in position in said receptacle, releasable locking means engaging said holding means only when said handset is in said receptacle, and a hookswitch operated homing mechanism for returning the station selector switch to a predetermined position when the handset is returned in place in said receptacle.

References Cited by the Examiner

UNITED STATES PATENTS

| | | | |
|---|---|---|---|
| 437,986 | 10/1890 | Graham ------------ | 179—99 |
| 794,134 | 7/1905 | Weman et al. -------- | 179—99 |
| 2,439,218 | 4/1948 | Obergfell ---------- | 179—100 |

KATHLEEN H. CLAFFY, *Primary Examiner.*

J. W. JOHNSON, A. H. GESS, *Assistant Examiners.*